United States Patent
Ramirez et al.

(10) Patent No.: US 11,475,760 B2
(45) Date of Patent: Oct. 18, 2022

(54) METHOD, DIGITAL TOOL, DEVICE AND SYSTEM FOR DETECTING MOVEMENTS OF OBJECTS AND/OR LIVING BEINGS IN A RADIO RANGE, IN PARTICULAR OF AN INDOOR AREA

(71) Applicant: SIEMENS SCHWEIZ AG, Zurich (CH)

(72) Inventors: Alejandro Ramirez, Munich (DE); Corina Kim Schindhelm, Munich (DE); Thorsten Ziercke, Lucerne (CH)

(73) Assignee: SIEMENS SCHWEIZ AG, Zurich (CH)

( * ) Notice: Subject to any disclaimer, the term of this patent is extended or adjusted under 35 U.S.C. 154(b) by 52 days.

(21) Appl. No.: 16/528,722

(22) Filed: Aug. 1, 2019

(65) Prior Publication Data

US 2019/0355242 A1    Nov. 21, 2019

Related U.S. Application Data

(62) Division of application No. 15/521,358, filed as application No. PCT/EP2015/075298 on Oct. 30, 2015, now Pat. No. 10,460,596.

(30) Foreign Application Priority Data

Oct. 31, 2014  (EP) ..................................... 14191345
Aug. 20, 2015  (EP) ..................................... 15181832
Aug. 20, 2015  (EP) ..................................... 15181834

(51) Int. Cl.
*G08C 17/02*     (2006.01)
*G08B 13/24*     (2006.01)
(Continued)

(52) U.S. Cl.
CPC ............ *G08C 17/02* (2013.01); *G01S 13/003* (2013.01); *G01S 13/56* (2013.01); *G01S 13/88* (2013.01);
(Continued)

(58) Field of Classification Search
CPC ........ G01S 13/003; G01S 13/56; G01S 13/88; G08B 13/24; G08B 13/2491; G08C 17/02; G08C 2201/32
See application file for complete search history.

(56) References Cited

U.S. PATENT DOCUMENTS 7,088,236 B2   8/2006  Sorensen
8,384,614 B2   2/2013  Kennedy
(Continued)

FOREIGN PATENT DOCUMENTS

| CN | 102007428 A | 4/2011 |
|---|---|---|
| CN | 103543700 A | 1/2014 |

(Continued)

OTHER PUBLICATIONS

International Search Report for PCT/EP2015/075298; International Filing Date: Oct. 30, 2015.
(Continued)

*Primary Examiner* — Timothy X Pham
(74) *Attorney, Agent, or Firm* — Schmeiser, Olsen & Watts LLP

(57) ABSTRACT

In order to detect movements of objects and/or living beings in a radio range, which enables easily with a minimum of hardware complexity an automated movement detection based on a Single-Sensor, it is proposed to: Collect as input data for the movement detection based on received radio signals of an intended or unintended communication between a transmitting radio terminal being mobile or fixed and a receiving local fixed radio device in the radio range a (Continued)

Figure 1:
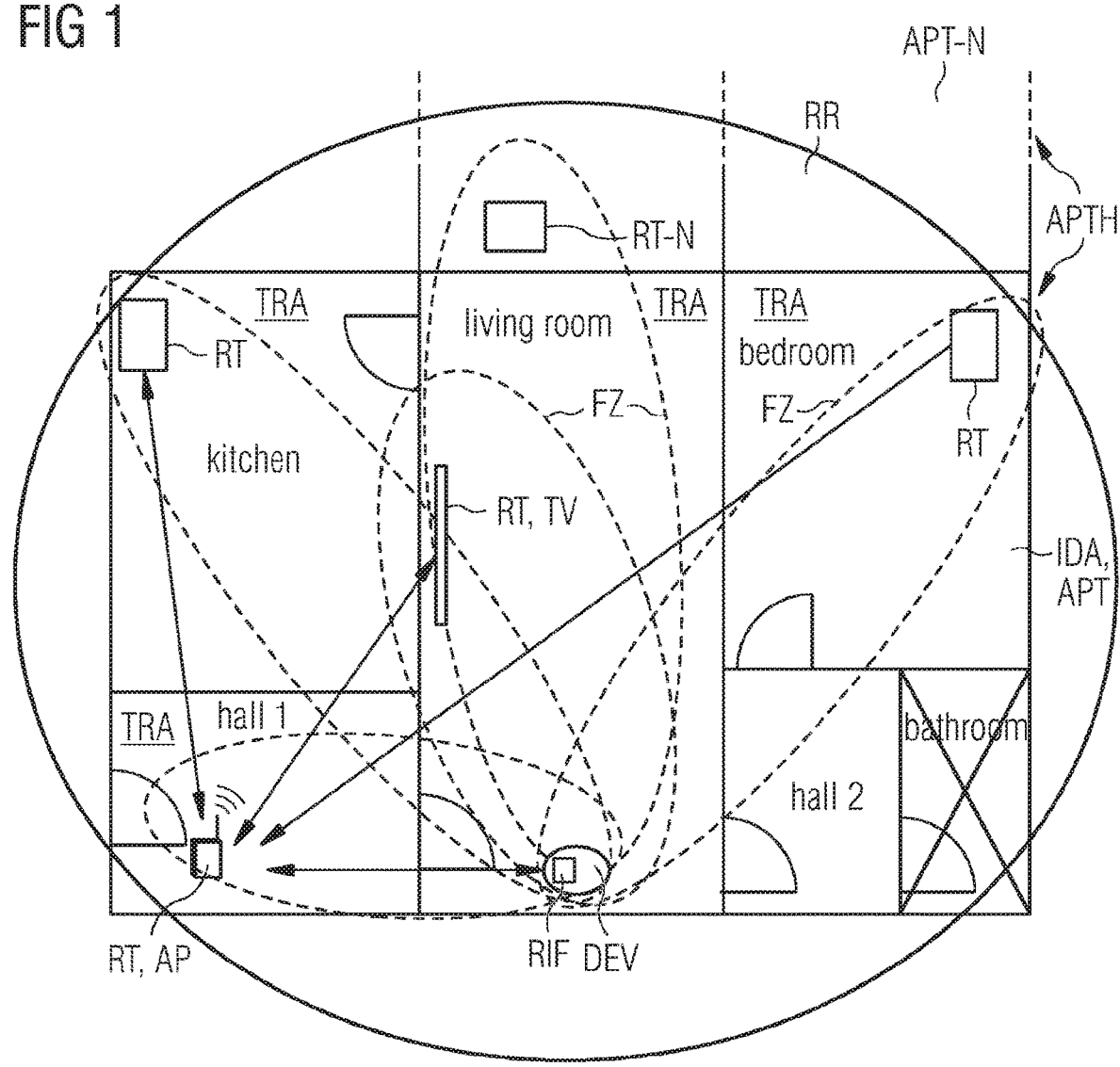

set of "Channel State Information"-values, determine a change in the received radio signals, which are derived from the facts that the movement influences the transmitted radio signal in the radio range based on the collected CSI-values by the indication of a statistical parameter value, and assess on the basis of the statistical parameter value a "chaos index" value until the "chaos index" value in accordance with a threshold check provides a reliable statement.

12 Claims, 7 Drawing Sheets

(51) Int. Cl.
*G01S 13/00* (2006.01)
*G01S 13/56* (2006.01)
*G01S 13/88* (2006.01)

(52) U.S. Cl.
CPC ......... *G08B 13/24* (2013.01); *G08B 13/2491* (2013.01); *G08C 2201/32* (2013.01)

(56) References Cited

U.S. PATENT DOCUMENTS

| | | |
|---|---|---|
| 8,730,087 B2 | 5/2014 | Filippi et al. |
| 2011/0148689 A1 | 6/2011 | Filippi et al. |
| 2011/0309933 A1* | 12/2011 | Marino ................. G08C 17/02 340/539.32 |
| 2014/0247179 A1 | 9/2014 | Furuskog et al. |
| 2016/0338002 A1* | 11/2016 | Yiu ........................ H04L 5/0057 |
| 2017/0365163 A1 | 12/2017 | MacKenzie |
| 2019/0158340 A1* | 5/2019 | Zhang .................. H04B 17/309 |

FOREIGN PATENT DOCUMENTS

| | | |
|---|---|---|
| CN | 103891369 A | 6/2014 |
| WO | 2009128002 A1 | 10/2009 |
| WO | WO 2009128002 A1 | 10/2009 |
| WO | 2013056731 A1 | 4/2013 |
| WO | WO 2013056731 A1 | 4/2013 |

OTHER PUBLICATIONS

Restriction Requirement dated Mar. 7, 2019 for U.S. Appl. No. 15/521,358.
Notice of Allowance dated May 8, 2019 for U.S. Appl. No. 15/521,358.
English Translation of Chinese Office Action for Application No. 201580059289.7, dated Jun. 28, 2019.
Chinese Office Action dated Jun. 28, 2019 for Application No. 201580059289.7.
Zhou Zimu et al.: "Omnidirectional Coverage for Device-Free Passive Human Detection"; IEEE Transactions on Parallel and Distributed Systems, IEEE Service Center,Los Alamitos, CA, US; vol. 25; No. 7; pp. 1819-1829; XP011550979; ISSN: 1045-9219, DOI:10.1109/TPDS.2013.274;; 2014.
International Search Report for PCT/EP2015/075298; International Filing Date: Oct. 30, 2015; 14 pgs.

* cited by examiner

METHOD, DIGITAL TOOL, DEVICE AND SYSTEM FOR DETECTING MOVEMENTS OF OBJECTS AND/OR LIVING BEINGS IN A RADIO RANGE, IN PARTICULAR OF AN INDOOR AREA

CROSS-REFERENCE TO RELATED APPLICATIONS

This application is a divisional application of U.S. application Ser. No. 15/521,358, filed Apr. 24, 2017 and entitled "METHOD, DIGITAL TOOL, DEVICE AND SYSTEM FOR DETECTING MOVEMENTS OF OBJECTS AND/OR LIVING BEINGS IN A RADIO RANGE, IN PARTICULAR OF AN INDOOR AREA," which claims priority to PCT Application No. PCT/EP2015/075298, having a filing date of Oct. 30, 2015, which is based upon and claims priority to EP Application No. 15181832.5, having a filing date of Aug. 20, 2015, which is based upon and claims priority to EP Application No. 15181834.1, having a filing date of Aug. 20, 2015, which is based upon and claims priority to EP Application No. 14191345.9, having a filing date of Oct. 31, 2014, the entire contents of all priority documents which are incorporated herein by reference.

FIELD OF TECHNOLOGY

The following relates to a method for detecting movements or a lack of movements of objects and/or living being in a radio range which influence radio signals of at least one radio terminal transmitted on a number of radio channels being divided each in at least one sub-channel, received by a local fixed radio device in the radio range. The methods involve starting a notification procedure when a value of at least one parameter describing at least one property of a sub-channel are collected for each time interval out of a predetermined number of time intervals, to form a set of parameters, a value of a statistical parameter is derived from the set of parameters, the values of the statistical parameters are combined to yield a chaos index value, the chaos index value is compared with a threshold value, and if the comparison yields a predefined result, a notification procedure is started.

BACKGROUND

For detecting movements consequently presences of objects and/or living beings in a limited area, in particular of an indoor area, many different approaches (e.g. methods, systems etc.) exist, but all of them have limitations.

Talking in the following about "movement detection" means in the context of the application a "movement and consequently presence detection". The reason for this is: When e.g. only the movement of a human or animal inside a room is detected (movement detection; "only" means there is e.g. no camera showing whether the movement comes originally from the human or animal), then the statement which can be made only for sure is that somebody or something is in the room (presence detection; but for the decision, whether the detected movement goes back to a human or animal, more especially sensor-related information is necessary).

A limited area besides the mentioned indoor area but outside of a building is for example a radio range, whereby the limitation is given by the radio coverage.

A first obviously known approach for movement detection is based on a simple motion detector (i.e. Passive Infra-Red sensor—PIR sensor). Such a simple motion detector will be a cheap and simple way to detect if a person is in a room as a typical indoor area. However, in order to cover a whole apartment as another larger indoor area, one sensor per each room has to be set up, because PIR sensors cannot see through walls. This will require setting up data communication and power for each of the sensors, as well as looking for suitable positions for said sensors.

A very innovative alternative to the "simple motion detector"-based scenario is the use of gas sensors built into an apparatus to detect the presence of people. The main disadvantage of such an approach is that it will take several minutes to detect such a presence, which is undesirable when controlling the lighting of the apartment. It should be mentioned that at the moment this approach cannot be found in any commercial devices.

Yet another approach to the "simple motion detector"-based scenario is to detect the use of equipment inside the apartment, for example switching on and off televisions, tablets or cooking appliances. While this would certainly be a positive indication of the presence of somebody in the apartment, this approach also has an undesirable delay especially if no equipment is used, which would not allow it to be used for applications such as turning on lighting.

Even another approach which would trigger home automation equipment in a similar fashion to the "simple motion detector"-based scenario, and one that can already be found in the market, is to program beforehand the time in which the apartment will be occupied, so that the thermostat and lighting may be turned on in advance. Unfortunately, people don't always go in and out of the apartment the exact same minute, leading to energy waste when the programmed time has arrived but the people haven't.

Lastly, if people were forced to always carry a device with them (for example a smartphone), the device's sensors and wireless communication may be used for presence detection. However, this would force people to always carry such devices with them, having them turned on at all time and charged. This presents an important limitation when detecting children and pets inside the apartment.

Other approaches may exist. But none of these fulfill the following requirements raised out of the above reflection of the different approaches:
Fast acting,
Covering the limited area (e.g. a radio range), in particular the whole apartment,
People carrying no devices
Off-the-shelf hardware and
Single-Sensor.

SUMMARY

An aspect relates to a method, a digital tool, a device and a system for detecting movements of objects and/or living beings in a radio range, in particular of an indoor area, which enables easily with a minimum of hardware complexity an automated movement detection based on a Single-Sensor, which fulfills in addition the other requirements cited above.

This aspect is solved based on a Method for detecting movements defined herein.

This aspect is further solved based on a Digital Tool for detecting movements defined herein.

Furthermore the aspect is solved based on a Device for detecting movements defined herein.

Moreover the aspect is solved based on a System for detecting movements defined herein.

It is further an aspect of the embodiments of the invention to propose a method for detecting movement of objects and/or living beings in a radio range, in particular of an indoor area, which influence radio signals of at least one radio terminal transmitted on a number of radio channels divided each in at least one sub-channel, and received by a local fixed radio device in the radio range, whereby values of specific statistical parameters are combined to yield a chaos index value which is compared to a threshold value, and, if the comparison yields a predefined result, a notification procedures is started.

This aspect is solved based on a Method for detecting movements defined herein.

It is a further aspect of the embodiments of the invention to propose a computer program product comprising a program code for executing the method for detecting movements (or lack of movements) of objects and/or living beings in a radio range when run on at least one wireless enabled device or processor. This aspect is solved based on the a computer program product (non-transitory computer readable storage medium having instructions, which when executed by a processor, perform actions) defined herein.

Preferred embodiments of the invention propose a Method or Digital Tool or Device or System that enables each an automated, preferably hard- and software-related, wireless-based movement detection of objects and/or living beings, e.g. people, influencing transmitted radio signals of at least one radio terminal in a radio range, e.g. an indoor area—especially different rooms inside of an apartment, by:

(i) Collecting as input data for the movement detection based on received radio signals, in particular "Wireless Local Area Network [WLAN]"/"Wireless Fidelity [WiFi]"-signals according to IEEE 802.11, of an intended or unintended communication between a transmitting radio terminal being mobile or fixed and a receiving local fixed radio device in the radio range a set of "Channel State Information [CSI]"-values, (ii) Determining a change in the received radio signals, which are derived from the facts that the movement influences the transmitted radio signal in the radio range, e.g. by at least one of reflection, refraction, diffraction and absorption, based on the collected "Channel State Information [CSI]"-values by the indication of a statistical parameter value, and (iii) Assessing on the basis of the determined statistical parameter value a "chaos index" value until the assessed "chaos index" value in accordance with a threshold check provides a reliable statement, which is preferably at least one detection data (digital form of the statement) or at least one detection signal (analogue form of the statement), particularly being used for controlling purposes, e.g. a YES-/NO-statement representing for instance a Switched ON/OFF-respectively Switched OFF/ON-status of an appliance.

Such invention embodiments use a simple existing "WLAN/WiFi"-device in listening mode, and runs software on only this equipment. No additional hardware or software components are required, except for any standard off-the-shelf "WLAN/WiFi"-device in the environment to be transmitting anything. Thus it maintains low cost and simplicity, which are important factors.

Instead of the preferred embodiment based on the "Wireless Local Area Network [WLAN]"/"Wireless Fidelity [WiFi]"-communication according to IEEE 802.11 other embodiments are possible, which are based on any wireless communication according to, for example, "Bluetooth", "DECT" and "ZigBee".

Also, it is assumed that there will be wireless traffic coming from devices located physically within or around the radio range as the desired detection zone. If no traffic exists, the local fixed radio device may generate it itself. As an example implementation, the desired detection zone might be a home (house, apartment etc.) and the local fixed radio device on which the subject matter of embodiments of the invention implemented is for instance a smart television. Other wireless devices in the home that can generate wireless traffic could include an access point, one or more laptop computers, mobile phones, tablets, and other smart devices.

The controlling purpose could be the automatically controlling of domestic appliances or facilities, in particular heating, climate control, lighting or security facility, or in general all aspects concerning home automation and home entertainment.

A highly advantageous feature of embodiments of the invention is that no hardware changes will be required. A motion sensor can be built using for example a standard WLAN-enabled device. Obtaining such a feature through only software will provide a great strategic advantage for a product. It may be used to monitor secured areas in which WLAN-infrastructure is available. It may be used for home automation for example to turn on or off a lot of domestic appliances or facilities, in particular the heat, climate, security or lighting of an apartment.

Another advantageous feature of embodiments of this invention is that through the remote access of CSI-data, one simple device can detect movement on a whole building, using each the building WLAN-infrastructure as sensors.

Yet another important advantage over other systems is that no calibration is required, as it will do a comparison of the signal against itself.

In embodiments of the invention the specific nature is that:

(1) The person, whose movement in the radio range with the transmitting radio device and the receiving radio device should be/is detected, must not carry themselves any electronic device transmitting the radio signals.

(2) The movement detection doesn't provide any information to individually identify the person or persons in the radio range, just know if there is anybody inside (presence detection; cf. the remarks above) and to identify the specific place within the radio range in which person is or the persons are located.

(3) It is enough to have a single point in the radio range, the local fixed radio device, working as a sensor for the radios signals and the changes therein; for this reason one speaks of a "single-sensor".

(4) A channel estimation function inside a commercial off-the-shelf WLAN/WiFi-radio interface is used in the local fixed radio device. To access the information being required methods in conformity to the IEEE 802.11 standard are used to access the "Channel State Information [CSI]"-data for detecting a movement inside the radio range, preferably a room.

Explanation of the "Channel State Information [CSI]": The wireless communication channel is very unstable. Reflections, refractions, diffractions and absorptions of the signal happens constantly, as there are walls, doors, furniture and people located around two communicating devices. The wireless signals being received are not only affected by the obstacles in the direct line-of-sight between the devices. It is also affected by anything that can cause a reflection, which will forward energy towards the receiving antenna. For this reason, almost every wireless communications standard includes a calibration phase during the communication. This is done by sending a data sequence known beforehand which is called "preamble" and defined by the standard. The receiver will then compare the received signal with the sent signal in the frequency domain, so that it can build a "compensation vector". In the case that a "Multiple Input Multiple Output (MIMO)" system is used, compensation is done per antenna, which leads to a "compensation matrix" instead of a "compensation vector".

When the CSI-Matrix will contain the information about the channel, which is directly affected by the obstacles in the room, then a change in the matrix will imply a change in the channel, which will then imply a change in the obstacles in the room. A large change in the matrix will imply a large change in the reflections generated. A static matrix will mean that the channel stayed the same, meaning no movement was present. A static matrix is impossible to encounter in real life, due to thermal noise and similar effects.

This however will only work if the measuring WLAN/WiFi-device is static, which is the case due to the local fixed radio device. Moving the device will lead to great changes in the reflections received, even if no obstacles in the room were moving.

The CSI-matrix can only be obtained from the local radio device, if the driver therein allows it. However, the capability of obtaining it locally is not available in all drivers present on the market today. For this reason we have developed an additional way of achieving this: The IEEE802.11n-2009 amendment to the IEEE802.11 standard allows a standardized way of obtaining the CSI-matrix from a remote device. This information will be obtained inside a CSI-frame (cf. IEEE802.11n-2009, Section 7.4.10.6), which contains a field called "CSI Report Field" (cf. IEEE802.11n-2009, Section 7.3.1.27). Through this, one device can obtain the CSI-matrixes of all devices in the radio range, allowing for a monitoring of a large area of coverage from one single point.

(5) For getting ready to detect a movement inside the radio range, preferably a room, the CSI-matrix information is processed and calibrated automatically. Thus, after the information is obtained, signal processing will be required. To allow algorithms to work on any (previously unknown) environment, only a parameter "change" is measured. Since the movement in the room will change the amount and the intensity of the reflections, only the newly arriving data to previous data is constantly compared. By doing this, no manual calibration is required and obtaining a baseline with an empty room is not needed.

Advantageously, various embodiments of the invention provide for a a computer program product (non-transitory computer readable storage medium having instructions, which when executed by a processor, perform actions) comprising a program code for executing the method for detecting movements or lack of movements when run on at least one wireless enabled device or processor, in its embodiments. Processors can, for example, without limitation, include a CPU or any other appropriate processor.

Also, advantageously, various embodiments of the invention provide for a data carrier for storing a computer program product (non-transitory computer readable storage medium having instructions, which when executed by a processor, perform actions). The data carrier can use any appropriate storage media, for example, without limitation, a USB, DVD, or other readable media.

Additional embodiments of the invention provide for a method for detecting movements or a lack of movements of objects and/or living being in a radio range which influence radio signals of at least one radio terminal transmitted on a number of radio channels being divided each in at least one sub-channel, received by a local fixed radio device in the radio range, whereby a value of at least one parameter describing at least one property of a sub-channel are collected for each time interval out of a predetermined number of time intervals, to form a set of parameters, a value of a statistical parameter is derived from the set of parameters, the values of the statistical parameters are combined to yield a chaos index value, the chaos index value is compared with a threshold value, and if the comparison yields a predefined result, a notification procedure is started. Preferably, a predefined result is that the chaos index value exceeds the threshold value in the case of detecting movements or in the case of detecting a lack of movements falling below the threshold value. More preferably, the notification procedure comprises a contacting, in particular via telephone or email, a predefined entity, or/and switching on electrical appliances, in particular a camera or/and a siren or/and light or/and stereosystem.

Of a sui generis design the subject matter of embodiments of the invention is preferably on one side either a Method or a Digital Tool and on the other either a Device or a System.

The Digital Tool includes a program module running on a processor, whereby the program module is preferably downloadable from a server or cloud or is uploadable via a "Universal Serial Bus [USB]"-stick or in addition is stored, uploadable or downloadable into a storage media being inserted or insertable into or integrated in the Device including a processor and a radio interface. Regarding the cited options (alternatives) the Digital Tool is preferably an "App" (Application Software) running on processors of different radio devices, which could be a desktop PC or an "All-In-One" PC incorporating each a radio interface, a smartphone, a notebook, a tablet etc. In other words the Digital Tool is preferably a purpose-designed computer program product (non-transitory computer readable storage medium having instructions, which when executed by a processor, perform actions). The Digital Tool can be sold or distributed separately or in common with the Device or the System for detecting movements. Such a Device or System could be for example a telecommunication appliance, a domestic appliance, a medical appliance, a home automation system, a home entertainment system etc.

BRIEF DESCRIPTION

Figure 2:
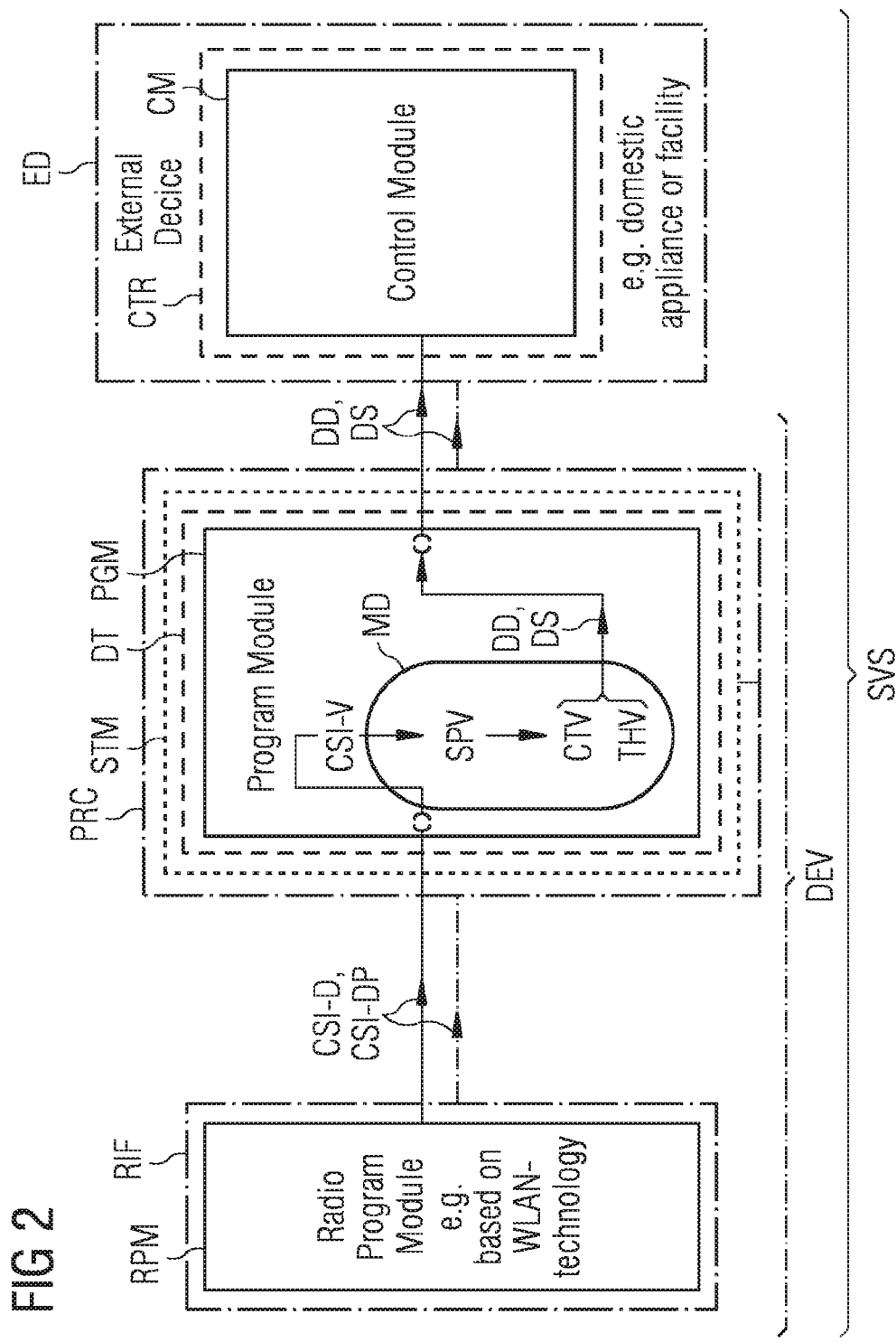
Figure 3:
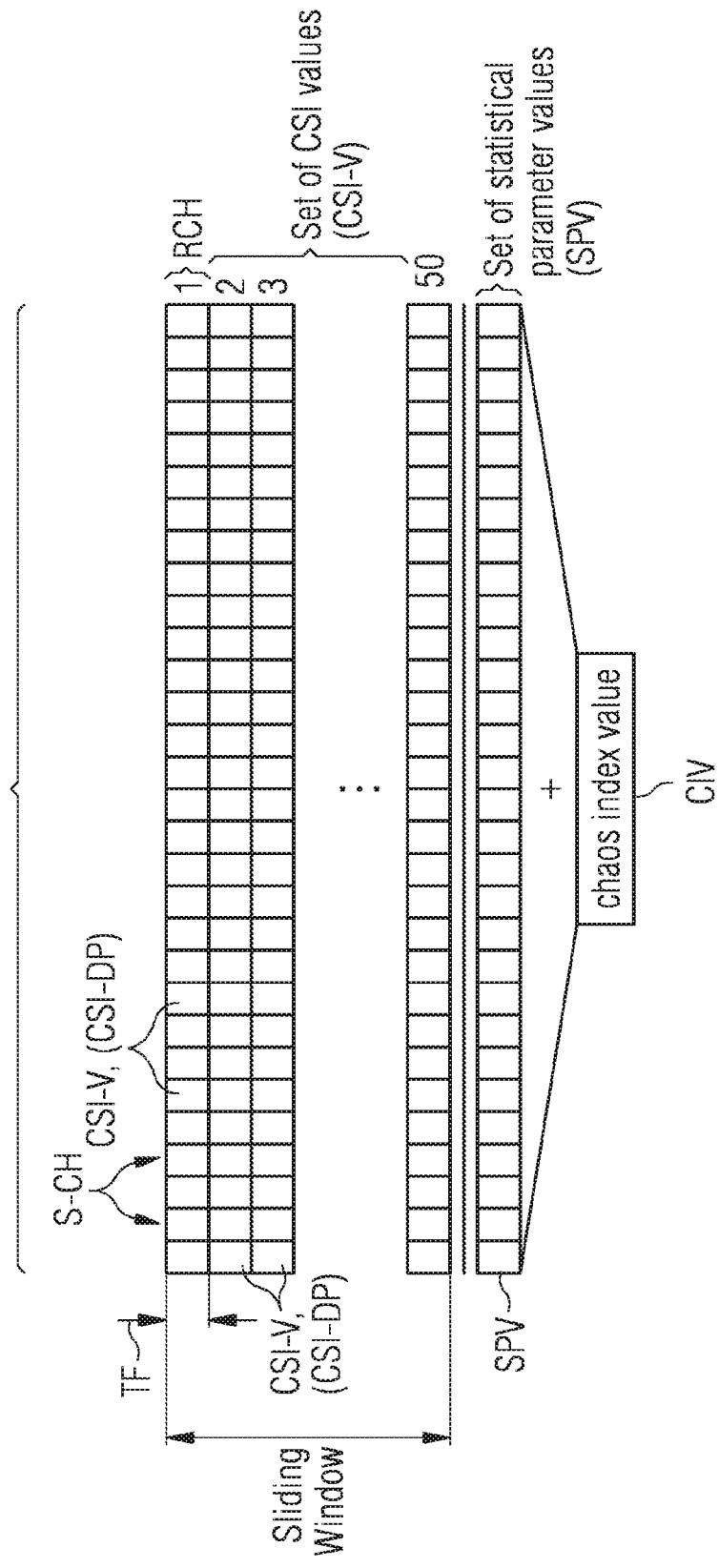
Figure 4:
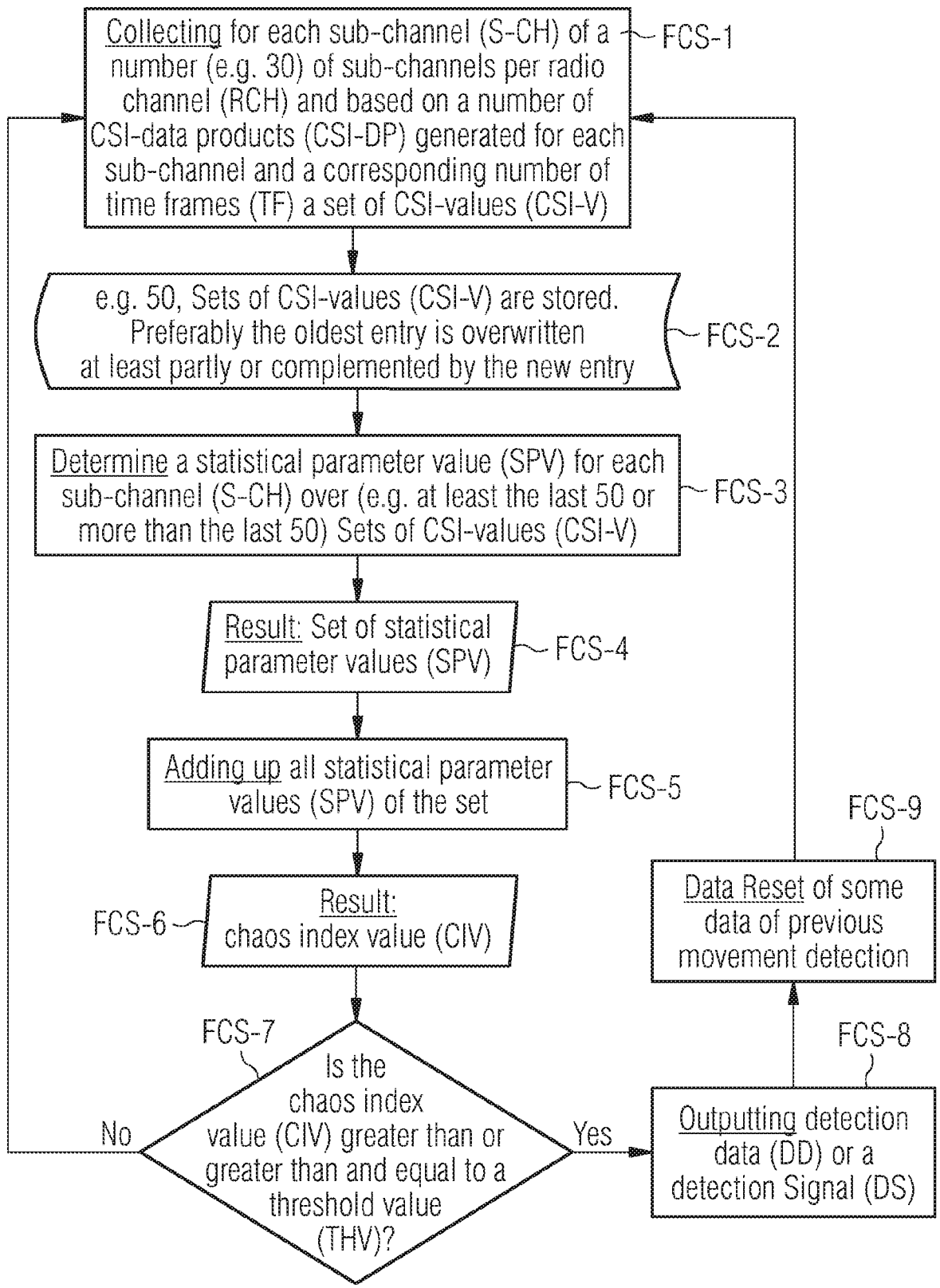
Figure 5:
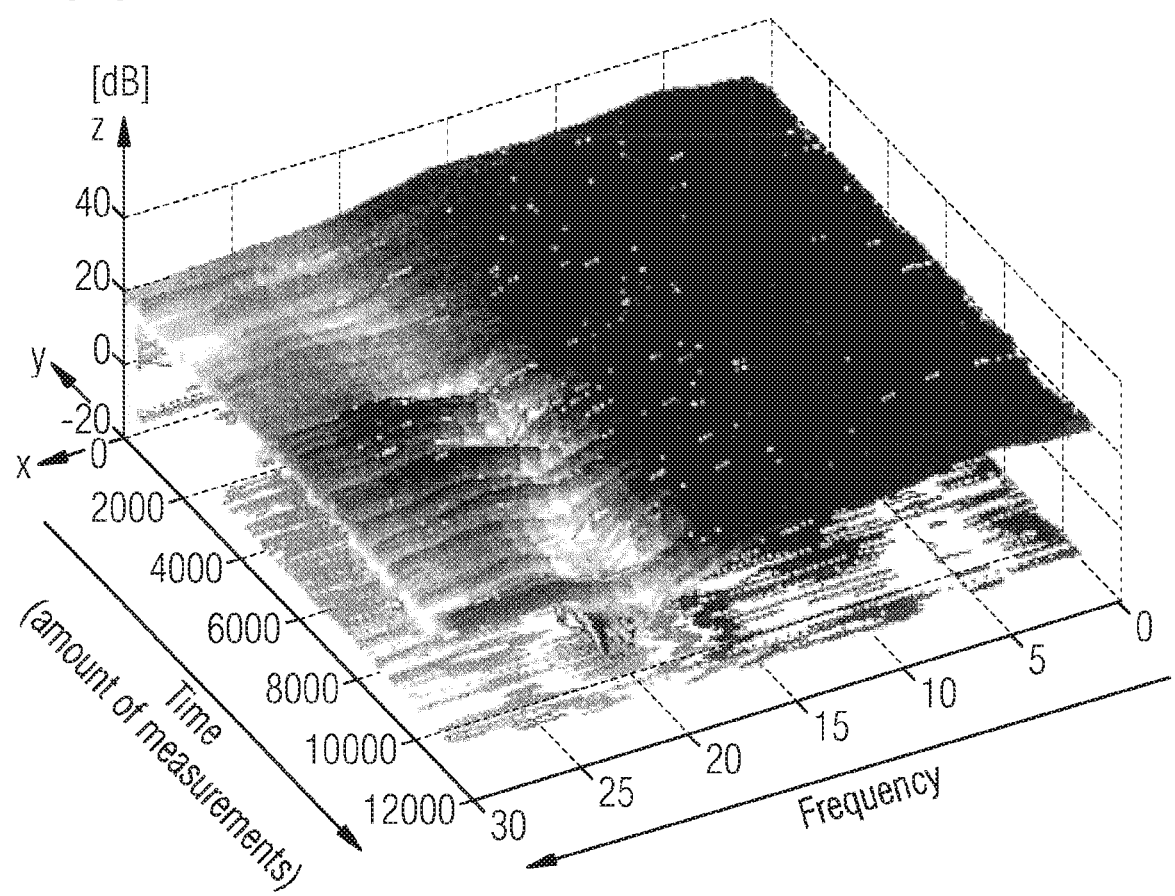
Figure 6A:
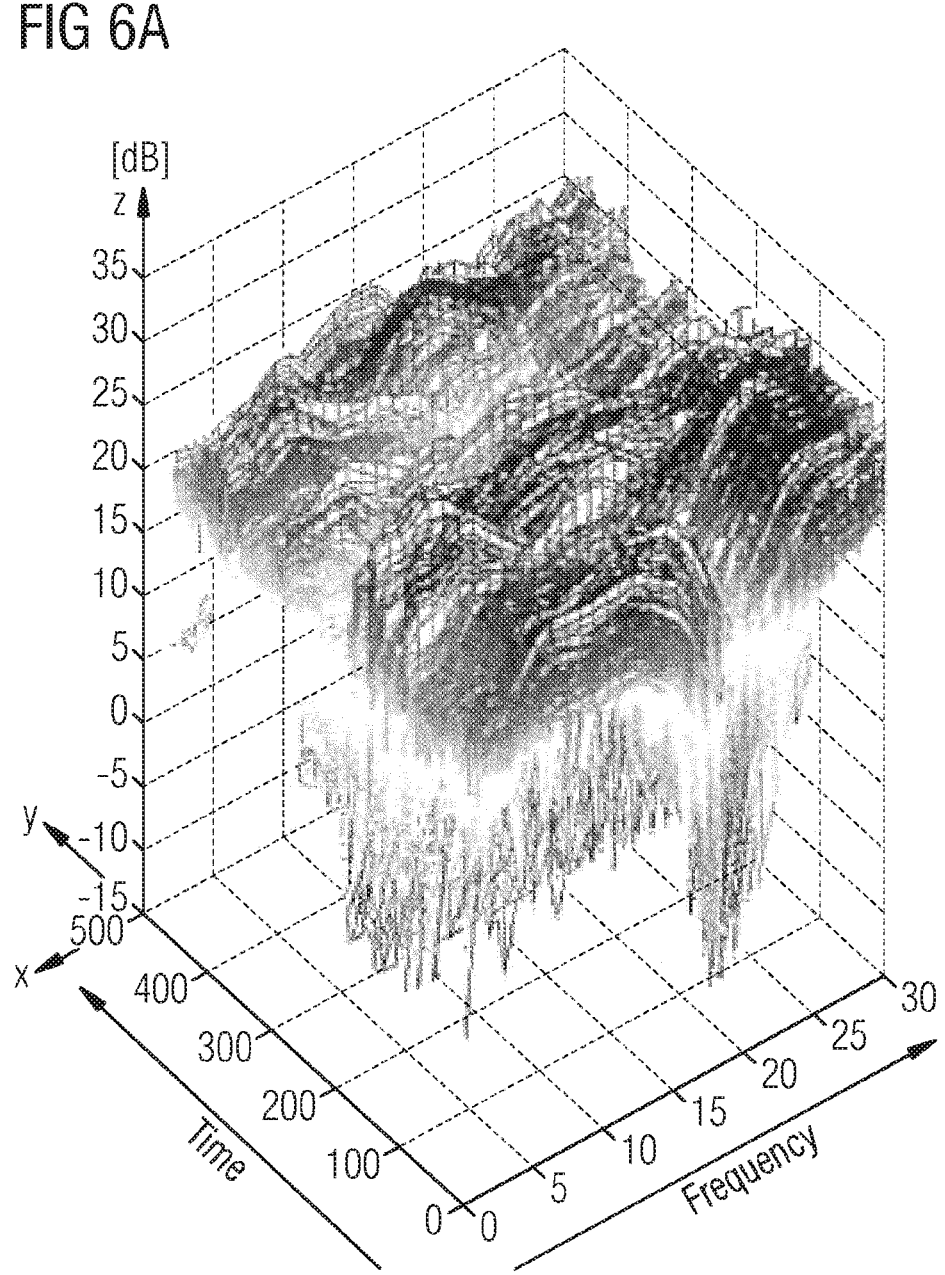
Figure 6B:
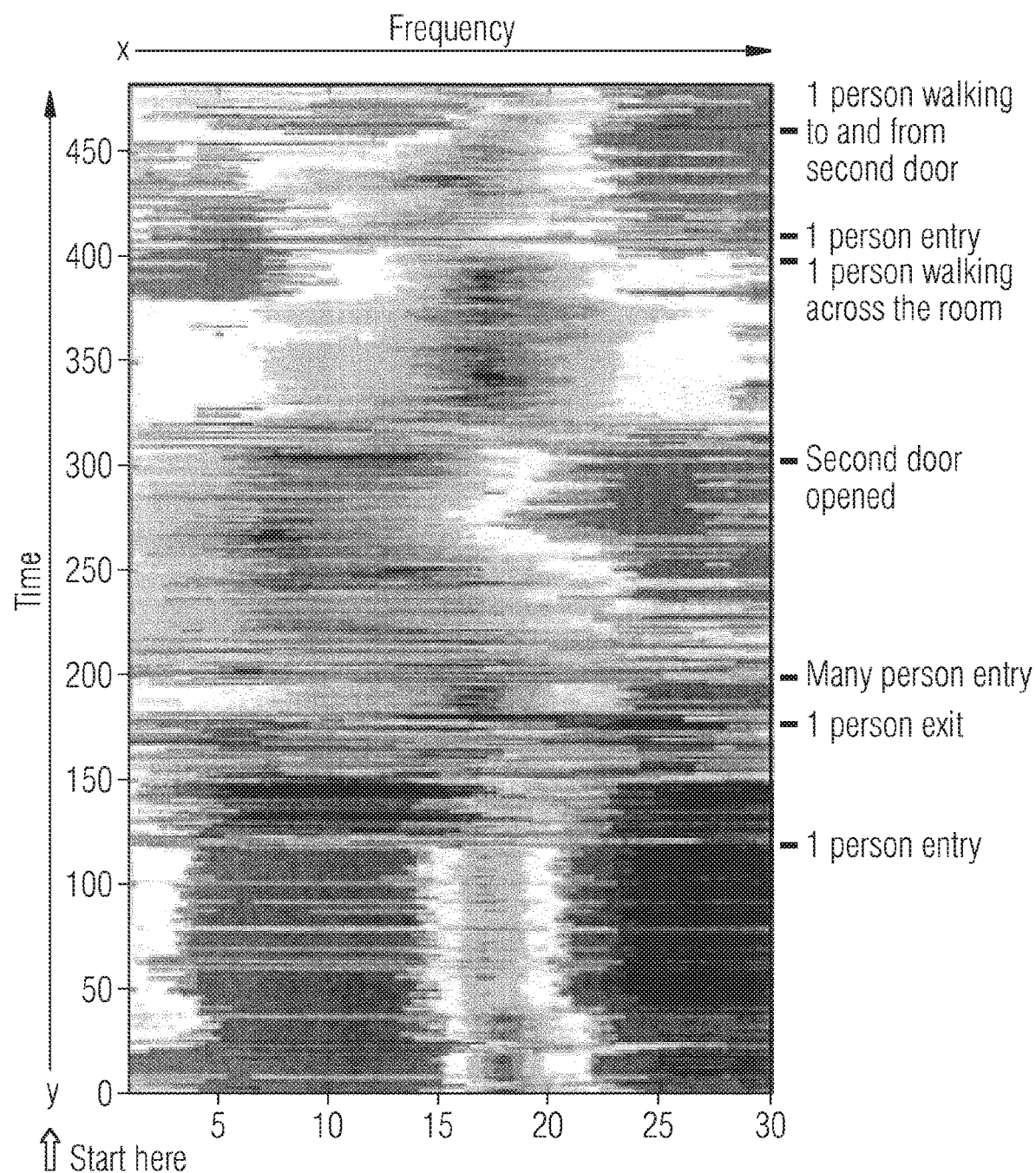

Some of the embodiments will be described in detail, with reference to the following figures, wherein like designations denote like members, wherein:

FIG. 1 a scenario for detecting movements of objects and/or living beings in a radio range;

FIG. 2 a layout of a Digital Tool, a Device and a System for detecting movements of objects and/or living beings in the radio range according to the FIG. 1;

FIG. 3 based on channel structure the evaluation of a change in the radio signals due to at least one of reflection, refraction, diffraction and absorption;

FIG. 4 a flow chart for movement detection representing an algorithm of the Digital Tool respectively the program module according to the FIG. 2 using radio signals, in particular "Wireless Local Area Network [WLAN]"-technology based signals, measuring and evaluating the change according to the FIG. 3;

FIG. 5 a first graphical 3D representation of the measurement and evaluation of the change in the radio signals due to at least one of reflection, refraction, diffraction and absorption;

FIG. 6a a second graphical 3D representation of the measurement and evaluation of the change in the radio signals due to at least one of reflection, refraction, diffraction and absorption; and FIG. 6b based on the FIG. 6a a corresponding 2D representation.

DETAILED DESCRIPTION

FIG. 1 shows a scenario for detecting movements of objects and/or living beings in an indoor area IDA such as e.g. an apartment APT of an apartment house APTH. A living beings which movement in the indoor area IDA is detected could be for example a human or an animal, whereby an object which movement in the indoor area IDA is detected could be for example an interior blind or robot machines such as robot vacuum cleaner.

Adjacent to the apartment APT is a neighbor apartment APT-N. The depicted apartments APT contain several rooms, six rooms in the apartment APT and two rooms in the neighbor apartment APT-N being graphically outlined. In both apartments APT, APT-N a local area wireless infrastructure is deployed. This could be for instance a "Wireless Local Area Network [WLAN]", but also other wireless technologies are possible such as Bluetooth, DECT, ZigBee etc. The six rooms in the apartment APT are an entrance hall identified in FIG. 1 by "hall 1", a kitchen, a living room, a bedroom, a dressing room identified in FIG. 1 by "hall 2" and a bathroom, whereby the two rooms of the neighbor apartment APT-N are not identified in detail.

Due to the "Wireless Local Area Network" deployed in each apartment a radio range RR or coverage area is given, which is not inevitable limited to the apartment APT (cf. the depiction in the FIG. 1 where the radio range RR or the coverage area is extended to the neighbor apartment APT-N). In general the radio range RR is essentially given by the maximum distance between a transmitting device transmitting radio signals to a receiving device receiving the transmitted radio signals according to radio frequency "Line-of-Sight [LoS]". Fresnel zones FZ are ellipsoide shaped areas between the antennas of two devices in which the presence of an object will generate destructive reflections, causing an important reduction in the energy transferred. Since the radio signals are transmitted, e.g. on a number of radio channels being e.g. divided each in at least on sub-channel, between the transmitting device and the receiving device and the radio signal transmission can be realized in both directions, the two devices are called transceiving devices. This situation is depicted in the FIG. 1 by a double-arrow and/or the Fresnel ellipse FZ (an ellipse being the 2D representation of an ellipsoid) between two transceiving devices, whereby each the double-arrow indicates the intended communication between the two transceiving devices. This however means that in those cases, where only the Fresnel ellipse or zone FZ without the double-arrow is shown, an unintended communication between the two transceiving devices is present.

The "Wireless Local Area Network" deployed in the apartment APT is formed by several fixed or mobile radio terminals RT, which may be distributed across the apartment APT, and a local fixed radio device DEV with a radio interface RIF encompassing a Radio Program Module, which is a software module sometimes called a driver, which is based on the wireless technology being used. The same could be possible in principle for the neighbor apartment APT-N. However as depicted in the FIG. 1 there is only one fixed or mobile radio terminals RT-N in a room of this apartment APT-N, whereby this radio terminals RT-N transmits unintendedly radio signals to the local fixed radio device DEV in the apartment APT (cf. depicted by the Fresnel ellipse between both devices). If a radio signal is not going to or coming from a dedicated network (e.g. the network within the apartment APT), the signal could be completely ignored. This is done through analysing the sending and receiving addresses in the header of a wireless frame, and will guarantee that movement in a neighboring apartment will have no effect on the occupancy detection.

With respect to the apartment APT shown in the FIG. 1 there are four radio terminals RT located in the hall 1, the kitchen, the living room and the bedroom. In the living room there is also located the local fixed radio device DEV. From the cited four radio terminals RT that one in the hall 1 is designed as a wireless access point AP, which is the interface of the "Wireless Local Area Network" to outside networks, e.g. a wired network for Internet and telephony applications. One radio terminal RT of the remaining three radio terminals RT for example that one in the living room is implemented in a television TV. The two other radio terminals RT in the bedroom and in the kitchen could be each for example a tablet or a smartphone. All three remaining radio terminals RT have a direct connection to the wireless access point AP, which is represented by the double-arrows.

In addition to this direct connections the wireless access point AP establishes and maintains each an intended communication with the other three radio terminals RT and the local fixed radio device DEV in the apartment APT although the corresponding Fresnel ellipse FZ is not depicted in each case.

As the local fixed radio device DEV listens to all the radio terminals at the same time, it is able to achieve a "detection area", which is presented substantially by the coverage of all Fresnel ellipses FZ. In reality, the "detection area" is not an absolute limit to where the movement can be detected, as walls and furniture will have some effect on the signal. But it is a very good approximation. Under some circumstances, some rooms may not be covered at all by the "detection area". This for instance is the case regarding the bathroom. Movement in rooms that don't have a wireless device may sometimes be detected, if the room is covered (or partially covered) by the wireless propagation of a signal. An example of such a situation would be the hall 2.

Another important, but optional, element is for the local fixed radio device DEV to be capable of a "monitor mode". The monitor mode is a capability present in most WLAN-devices which allows the reception of WLAN frames not directed toward for the local fixed radio device DEV.

One part of the "monitor mode" is done through hardware and another part through software. When the "monitor mode" is enabled an internal MAC filter will stop filtering the frames sent towards the device and will start forwarding the frames directed to other devices.

There are a lot of other implementations possible which differ from the present one. For example the "detection area" could essentially be as large as the radio range which means that more radio terminals are necessary or significantly smaller which decreases the chances for detecting movements in the radio range.

To implement a movement detection in the apartment APT with the "Wireless Local Area Network" existed therein a channel estimation function inside the local fixed radio device DEV with a commercial off-the-shelf radio interface RIF is used. In order to get the movement detection information methods for accessing "Channel State Information [CSI]" being in conformity to the "IEEE 802.11"-standard specification are used. For getting ready to detect movements inside the apartment APT the "Channel State Information" is processed and calibrated.

At this point it should be referred once again on the statements given above concerning the "Channel State Information [CSI]" and its meaning for the movement detection. The wireless communication channel is very unstable. Reflections, refractions, detractions and absorptions of a radio signal transmitted between two transceiving devices such as for instance between the wireless access point AP in the hall 1 and the local fixed radio device DEV in the living room happens constantly, because there are walls, doors, furniture and people located around the two communicating devices. The wireless signals being received are not only affected by the obstacles in the direct "Line-of-Sight" between the devices. It is also a fact, that anything that can cause an influence as just mentioned, which will forward energy towards the receiving antenna.

For this reason almost every wireless communication standard such as the IEEE 802.11 WLAN-standard defines a calibration phase during the communication. This calibration is done by sending a data sequence known beforehand which is called "preamble", defined by the WLAN-Standard and deployed by the transmitting device. The transmitting device could be the wireless access point AP in the hall 1 or any other radio terminal RT in the apartment APT or the neighbor apartment APT-N. The receiving device, which is in our case the local fixed radio device DEV in the living room, will then compare a received radio signal with the sent preamble signal in the frequency domain, so that the receiving device can form or generate a "compensation vector". In the case that a "Multiple Input Multiple Output [MIMO]"-system is used the compensation is done per antenna which leads to a "compensation matrix" instead of the "compensation vector".

In other words scalar-, vector- or matrix-based "Channel State Information [CSI]"-data are generated. As the CSI-data will contain the information about the channel, which is directly affected by obstacles in the apartment, a change in the CSI-data implies a change in the channel, which will then imply a change in the obstacles in the apartment APT. A large change in the CSI-data will imply a large change in the signals generated and influenced (e.g. by reflections, refractions, diffractions and absorptions).

However, this kind of movement detection will only work if the measuring local fixed radio device is static. Moving the local fixed radio device DEV will lead to great changes in the influenced signals received, even if no obstacles in the apartment APT were moving. The CSI-data can only be obtained from the local fixed radio device DEV, if the included radio interface RIF comprising a radio program module respectively driver, which for example is based on WLAN-technology, allows it. However, a capability of obtaining the CSI-data locally is not available in all radio interfaces RIF respectively drivers used therein, which are present on today's market. For this reason an additional way of achieving the CSI-data must be used. The IEEE 802.11n-2009 amendment to the "IEEE 802.11"-standard specification allows a standardized way of obtaining the CSI-data from a remote device. This information will be obtained inside a CSI-frame (cf. IEEE 802.11n-2009, section 7.4.10.6), which contains a field called "CSI report field" (cf. IEEE 802.11n-2009, section 7.3.1.27). By using this information the local fixed radio device DEV can obtain the CSI-data of all transceiving devices in the radio range RR, preferably the apartment APT, allowing for a monitoring of a large area of coverage from one single point. Using this would, for example, allow monitoring of the area between the television and the RT device in the bedroom.

FIG. 2 shows a layout based on functional blocks of a Digital Tool DT, the local fixed radio device DEV called as "Device" and a System SYS for detecting movements of objects and/or living beings in the radio range RR according to the FIG. 1 with an "functional block"-interaction on software respective module level (blocks with continuous lines) and on hardware respective device or system level (blocks with dash-dotted lines). All depicted blocks exist in the System SYS, whereas the blocks on the left side and in the middle of the FIG. 2 are part of the Device DEV.

The Digital Tool DT includes (regarding the mentioned software respective module level) a program module PGM being executable on a processor PRC, whereby the program module PGM is preferably downloadable from a server or cloud or is uploadable e.g. via a "Universal Serial Bus [USB]"-stick.

Furthermore (regarding the mentioned hardware respective Device or System level) it is possible that the Digital Tool DT respectively the program module PGM is stored, uploadable or downloadable into a computer-readable storage media STM being inserted or insertable into or integrated in the Device DEV with the processor PRC and the radio interface RIF as mentioned above. The computer-readable storage media STM is assigned to the processor PRC and forms with the processor PRC a common functional unit such that the processor PRC executes the program module PGM stored in the storage media STM.

Regarding the cited options (alternatives) the Digital Tool is preferably an "App" (Application Software) running on a processor of different radio devices, which could be a desktop PC or an "All-In-One" PC incorporating each a radio interface, a smartphone, a notebook, a tablet etc. In other words the Digital Tool is preferably a purpose-designed computer program product (non-transitory computer readable storage medium having instructions, which when executed by a processor, perform actions). The Digital Tool DT can be sold or distributed separately or in common with the Device DEV or the System SYS for detecting movements. Such a Device or System could be for example a telecommunication appliance, a domestic appliance, a medical appliance, a home automation system, a home entertainment system etc.

For the purpose of a movement detection MD executed by the program module PGM, when according to the scenario shown in the FIG. 1 and described above CSI-data CSI-D in the form of a number of CSI-data packets CSI-DP generated for the transmission of radio signals on each sub-channel of the number of channels in a number of time frames, in particular consecutive time frames, is generated, the number of CSI-data packets CSI-DP are input data either for the program module PGM of the Digital Tool DT being executable on the processor PRC or for the processor PRC executing the program module PGM stored in the storage media STM of the Device DEV respectively the System SYS. The input data is provided in the first case by a radio module RM and in the second case by the radio interface RIF.

With respect to the scenario shown in the FIG. 1 and described above the movement detection of objects and/or living beings in the radio range RR is done for all communications being intended or unintended in parallel or for a selected communication, whereby the selection of the communication is software-based/supported.

On the basis of the inputted CSI-data packets CSI-DP the program module PGM of the Digital Tool DT being executable on the processor PRC or the processor PRC executing the program module PGM stored in the storage media STM of the Device DEV respectively the System SYS collects as input data for the movement detection MD regarding the number of time frames a set of CSI-values CSI-V, which corresponds to the number CSI-data packets CSI-DP.

The movement detection MD based on influenced radio signals of at least one radio terminal RT transmitting the radio signals on a number of radio channels RCH being divided each in at least one sub-channel S-CH in the radio range RR as such, which will be described in detail later on with regard to FIGS. 3 and 4, is characterized by a statistical parameter value SPV being determined, a chaos index value CIV being calculated and due to a comparison of the chaos index value CIV with a threshold value THV by at least one detection data DD or at least one detection signal DS being outputted and indicating movements influencing the transmitted radio signals. The indicating of a movement could be enlarged to alert or notify any number of other Systems or Devices about the status of movement based upon the supplied data. The Systems or Devices being notified could consist of anything that would benefit from the motion detection just being carried out.

The at least one outputted detection data DD or the at least one detection signal DS can be used for automatically controlling external devices ED such as domestic appliances or facilities, in particular heating, climate control, lighting or security facility, or in general for home automation and home entertainment.

According to a preferred embodiment concerning to this matter and thereby going back to the FIG. 1 in a terminal-related area TRA of the apartment APT, which is given by the kitchen, the living room, the bedroom and the hall 1, and in which each at least one of the cited radio terminals RT is located in, the external device ED can be controlled separately and/or independently due to each the detection data DD or the detection signal DS being generated by the Digital Tool DT, the Device DEV and/or the System SYS for detecting movements regarding each terminal-related area TRA in the radio range RR.

Thus for example, when with respect to the living room a detection data DD or a detection signal is generated due to a movement of a person, e.g. walking in the cited room, the lightning in this room can switched ON provided that it was switched OFF before. In parallel, when with respect to the bedroom another detection data or another detection signal DS is generated due to a further movement of another person, e.g. also walking in the cited room, the lightning in this room can switched OFF provided that it was switched ON before.

Due to this given example it can be easily understood that a numerous examples of use are conceivable, which could be used each as a further embodiment.

The external device ED comprises for this purpose a control module CM running on an "external device"-specific controller CRT. In this case the System SYS for detecting movements of objects and/or living beings in the radio range RR exists, which comprises the Device DEV and the external device ED with the controller CRT and the running control module CM thereon. For such a System SYS the external device ED respectively the controller CTR is connected with the device DEV respectively the processor PRC of the device DEV and forms a functional unit with the device DEV respectively the processor PRC of the device DEV such that at the moment the device DEV respectively the processor PRC of the device DEV is detecting a movement of a living being an automatic controlling of the external device is carried out via the controller CTR and the running control module CM thereon. Preferably the external device ED being currently switched off is switched on or being currently switched on is switched off.

The Device or Digital Tool DT based on the mentioned functional blocks could be deployed or installed onto any other device with the cited radio interface as long as this device is fixed. So for example, the radio terminal integrated in the television or the wireless access point itself could be appropriate candidates. The environment is also not limited to an apartment. Subway tunnels or outdoor areas could also serve as potential locations. The algorithm itself does not have a maximum number of supported devices. This parameter is only limited by the hardware on which the algorithm is installed. It should also be mentioned that the Device or Digital Tool DT based on the mentioned functional blocks works independently of any encryption present.

Moreover the Device or Digital Tool DT based on the mentioned functional blocks could be designed such that the received signals will be catalogued depending on their source and destination. Thus as already mentioned above; if a signal is not going to or coming from a dedicated network, the signal could be completely ignored. This is done through analysing the sending and receiving addresses in the header of a wireless frame, and will guarantee that movement in a neighboring apartment will have no effect on the occupancy detection.

The algorithms and methods concerning the Digital Tool and implemented inside the Device take advantage of the existing wireless frames sent by the different devices inside the apartment. The WLAN-based occupancy detection is intrinsicly passive; it is not required to send a wireless frame of any kind to obtain a reading on the movement. Also of importance is that no additional software is required inside the devices (with the exception of the Device). If for some unexpected reason no wireless traffic exists, no occupancy detection can take place. For such cases, an application may be added to the Device to generate this wireless traffic whenever required.

The Device or Digital Tool DT based on the mentioned functional blocks is able to monitor all radio terminals in the radio range which are communicating intendedly or unintendedly to the apartment's wireless access point. This enables to limit the detection range to the one single apartment. Depending on the amount of radio terminals and the position of each radio terminal, the Device or Digital Tool DT based on the mentioned functional blocks can be able to detect movement in the whole apartment.

FIG. 3 shows based on channel structure the evaluation of a change in the radio signals due to at least one of reflection, refraction, diffraction and absorption. Based on the scenario shown in the FIG. 1 and described hereof at least one radio terminal RT transmits in the radio range RR, in particular relating each to the Fresnel zone FZ on a number of radio channels RCH being divided each in at least one sub-channel S-CH radio signals, in particular "Wireless Local Area Network [WLAN]"-technology based signals, which are received each by the local fixed radio device DEV due to each an intended or unintended communication between the radio terminal RT and the local radio device DEV.

To evaluate a change in the radio signals due to at least one of reflection, refraction, diffraction and absorption it is necessary at the beginning to collect for each sub-channel S-CH of a number (e.g. 30) of sub-channels per radio channel RCH and based on a number (e.g. 50) of CSI-data packets CSI-DP generated for each sub-channel S-CH and a corresponding number (e.g. 50) of time frames TF, in particular consecutive time frames TF, a set of CSI-values CSI-V, which corresponds to the number CSI-data packets CSI-DP. The number of time frames is called a "Sliding Window", whereby the term "sliding" means that the number is variable.

Then for each set of CSI-values CSI-V of each sub-channel S-CH of the number of sub-channels a statistical parameter value SPV is determined or calculated, which is preferably a value parameterized by the average of the squared differences from the mean being in other words the variance. But it is also possible (although less preferable) to determine or calculate a value parameterized by the average of the absolute differences from the mean or to determine or calculate the square root of the average of the squared differences from the mean being in other words the standard deviation. Moreover it also possible to that the statistical parameter value SPV is determined or calculated only for a fraction of the CSI-values CSI-V of the set, which means in conclusion that the statistical parameter value SPV is calculated at least for a fraction of the CSI-values CSI-V.

When this calculation is done for all sub-channels a set of statistical parameter values SPV is determined. Finally the statistical parameter values SPV of the determined set are added up to a "chaos index" value CIV.

The algorithm for analysis consists of collecting CSI data over a "Sliding Window" of 50 consecutive packets, corresponding to roughly one second, and computing the variance for each of the 30 subcarriers independently within the window. Then these 30 variances are summed to determine a "chaos index" value for the window. If this "chaos index" value is over a certain arbitrary and/or experimentally or automatically determined value then movement is detected.

The basis for this algorithm is that periods without movement should have a low variance and periods of measurement with movement should have a higher variance. The importance of using the variance is that it is not necessary to rely on any previous knowledge of the test location or a calibration period to decide if there is movement. This makes the analysis highly resistant to false positives resulting from changing environmental factors such as opened or closed doors, moved furniture, etc.

Later on the graphical 3D/2D representations depicted in FIGS. 5 to 6b illustrate well the importance of the use of the variance in the signal instead of some sort of comparison to a calibration period. If a comparison to a calibration period were used, it would be very difficult to detect instances when there is no movement but a new stability point such as when the second door was left open but there was little movement otherwise. It was found that, independent of the testing environment, the sum of the variances of each of the subcarriers over a given period of time, which is called the "chaos index", will not exceed a certain amount unless there is movement in the environment. Therefore it is avoided this problem which is very common in other movement detection algorithms. The variance mentioned here is only an example of the signal processing; many other options exist.

The actions to be triggered on a "detection event" may be determined in advance, or may even be determined dynamically in relation to other conditions like time of day or amount of sunlight outside. A further option is to select the action based on the CSI-information itself.

FIG. 4 depicts a flow chart for the movement detection MD being described in very rudimentary form with reference to the FIG. 2 representing an process (algorithm) of the Digital Tool DT respectively the program module PGM according to the FIG. 2 using radio signals, in particular "Wireless Local Area Network [WLAN]"-technology based signals, measuring and evaluating the change according to the FIG. 3.

In a first flow chart state FCS-1 for each sub-channel S-CH of a number (e.g. 30) of sub-channels per radio channel RCH and based on a number (e.g. 50) of CSI-data packets CSI-DP generated for each sub-channel S-CH and a corresponding number (e.g. 50) of time frames TF, in particular consecutive time frames TF, a set of CSI-values CSI-V is collected, which corresponds to the number CSI-data packets CSI-DP.

Then in second flow chart state FCS-2, e.g. 50, sets of CSI-values CSI-V are stored, whereby preferably the oldest entry is overwritten at least partly. Alternatively it is also possible to complement the old entry by the new entry.

In the following in a third flow chart state FCS-3 a statistical parameter value SPV for each sub-channel S-CH over, e.g. at least the last 50 or more than the last 50, sets of CSI-values CSI-V is determined or calculated. The statistical parameter value SPV is as already mentioned preferably a value parameterized by the average of the squared differences from the mean being in other words the variance. But it is also possible (although less preferable) to determine or calculate a value parameterized by the average of the absolute differences from the mean or to determine or calculate the square root of the average of the squared differences from the mean being in other words the standard deviation.

In a fourth flow chart state FCS-3 the result, a set of statistical parameter values SPV, is given.

Then in fifth flow chart state FCS-5 all statistical parameter values SPV of the set are added up, before in a sixth flow chart state FCS-6 the result, a "chaos index" value CIV, is given.

In the following in a seventh flow chart state FCS-7 it is checked whether the calculated "chaos index" value CIV is greater than or greater than and equal to a threshold value THV. If the answer of the comparison check is "NO", the movement detection process goes back to the first flow chart state FCS-1. However, if the answer of the comparison check is "YES", the movement detection process goes on with a eighth flow chart state FCS-8, in which detection data DD or a detection signal DS is outputted.

At this eighth flow chart state FCS-8 the movement detection process is finished, however if a new movement detection process need to be started again, some data, in particular and preferably those data generated in the flow chart for the movement detection MD beginning with the third flow chart state FCS-3 and ending with the eighth flow chart state FCS-8, of the finished movement detection process could be reset, which is done in a ninth flow chart state FCS-9, before it then goes back to the first flow chart state FCS-1.

FIG. 5 shows a first graphical 3D representation of the measurement and evaluation of the change in the radio signals due to at least one of reflection, refraction, diffraction and absorption. In the FIG. 5 the captured CSI data is visualized. In the 3D representation the horizontal axis on the left hand side is the number of packets captured and the horizontal axis on the right hand side is the sub-channel (subcarrier) index, of which there are always 30 for each packet. The measurements were made with roughly 50 packets per second. The vertical axis corresponds to the "CSI-Signal-To-Noise-Ratio"-values in dB. The scaled black-and-white representation corresponds to the same with the scale: dark black meaning there is a strong signal for that sub-channel (subcarrier) and minor dark black at the coordinate (x: 20; y: 9000) meaning there is a weak signal.

According to the FIG. 5 the signal is stable to begin with across all sub-channels (subcarriers). After about 4000 packets or 80 seconds we see a pattern of disruption around subcarrier 20. For that particular subcarrier the "Signal-To-Noise-Ratio" drops dramatically. This suggests movement and in this case a researcher was waving his hand in the "Line-of-Sight" of the wireless connection. All of this data was obtained using a commercial off-the-shelf WLAN-device. No hardware changes were done.

FIG. 6a shows a second graphical 3D representation of the measurement and evaluation of the change in the radio signals due to at least one of reflection, refraction, diffraction and absorption.

FIG. 6b based on the FIG. 6a a corresponding 2D representation.

The FIG. 6a shows as the FIG. 5 again a 3D representation of the CSI-data which is similar to that in the FIG. 5, while the FIG. 6b shows a 2D-based "overhead"-view of the same data as in the FIG. 6a that is easier to interpret. On this "overhead"-view the vertical axis is the number of packets and the horizontal axis is the sub-channel (subcarrier) index.

The scaled black-and-white representation corresponds to the "Signal-To-Noise-Ratio" in dB with the scale: dark black means high values and minor dark black at the coordinates (x: 8-15; y: 200-300 and x: 18; y: 325-400) means low values. There are also labels on the side of the plot. It can be seen that at the beginning of the measurements there is an empty room and a stable signal. As soon as somebody enters the room there is a huge disruption in the signal across all channels. The person then briefly exits the room and the signal becomes stable again until they reenter a few seconds later with more people around packet 200. The signal stays unstable while the people walk around and get settled at their desks. It stabilizes to a certain extent once everyone is at their desks but it is not as stable as when the room was empty. A second door is then left open from just after packet 300. This changes the signal dramatically but does not affect the overall stability of the signal in the long term. There is now a new stability point but we still see similar levels of disruption in the signal while people are moving, as can be seen from packet 400.

In the various embodiments of the invention, a computer program product (non-transitory computer readable storage medium having instructions, which when executed by a processor, perform actions) comprising a program code for executing the method for detecting movements (or lack of movements) run on at least one wireless enabled device or processor is foreseen. In these embodiments, a data carrier for storing a computer program product (non-transitory computer readable storage medium having instructions, which when executed by a processor, perform actions) is preferably also foreseen.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method for detecting movements or a lack of movements of objects and/or living being in a Fresnel zone-related radio range which influence radio signals of at least one radio terminal transmitted on a number of radio channels being divided in at least one sub-channel, received by a local fixed radio device in the radio range, wherein
   a) a value of at least one parameter describing at least one property of a sub-channel are collected for each time frame out of a predetermined number of time frames, to form a set of parameters, wherein the predetermined number of time frames is a sliding window,
   b) a value of a statistical parameter is derived from the set of parameters for the sliding window,
   c) the values of the statistical parameters are combined to yield a chaos index value for the sliding window,
   d) the chaos index value for the sliding window is compared with an arbitrary threshold value, wherein the arbitrary threshold value is not set by a calibration phase in the Fresnel zone-related radio range, and
   e) if the comparison yields a predefined result, a notification procedure is started.

2. The method according to claim 1, wherein the predefined result is that the chaos index value exceeds the threshold value in the case of detecting movements, or in the case of detecting a lack of movements falls below the threshold value.

3. The method according to claim 1, wherein the notification procedure comprises at least one of: contacting a predefined entity and switching on an electrical appliance.

4. The method according to claim 3, wherein the step of contacting the predefined entity includes at least one of contacting by telephone and contacting by email.

5. The method according to claim 3, wherein the electrical appliance is one of a camera, a siren, a light, and a stereo system.

6. A method for detecting movements or a lack of movements of objects and/or living being in a Fresnel zone-related radio range which influence radio signals of at least one radio terminal transmitted on a number of radio channels being divided in at least one sub-channel, received by a local fixed radio device in the radio range, comprising:
   a) collecting, in a sliding window, a value of at least one parameter describing at least one property of a sub-channel for each time frame out of a predetermined number of time frames, to form a set of parameters for the sliding window,
   b) deriving a value of a statistical parameter from the set of parameters for the sliding window,
   c) combining the values of the statistical parameters to yield a chaos index value for the sliding window,
   d) comparing the chaos index value for the sliding window with an arbitrary threshold value, wherein the arbitrary threshold value is not set by a calibration phase in the Fresnel zone-related radio range, and
   e) starting a notification procedure if the comparison yields a predefined result.

7. The method according to claim 6, wherein the predefined result is that the chaos index value exceeds the threshold value in the case of detecting movements, or in the case of detecting a lack of movements falls below the threshold value.

8. The method according to claim 6, wherein the notification procedure comprises at least one of: contacting a predefined entity and switching on an electrical appliance.

9. The method according to claim 8, wherein the step of contacting the predefined entity includes at least one of contacting by telephone and contacting by email.

10. The method according to claim 8, wherein the electrical appliance is one of a camera, a siren, a light, and a stereo system.

11. The method according to claim 6, wherein the value of a statistical parameter is a value parameterized by an average of the squared differences from the mean, the average of the absolute differences from the mean, or the square root of the average of the squared differences from the mean.

12. The method according to claim 1, wherein the value of a statistical parameter is a value parameterized by an average of the squared differences from the mean, the average of the absolute differences from the mean, or the square root of the average of the squared differences from the mean.

* * * * *